United States Patent [19]

Leung et al.

[11] Patent Number: 4,493,828
[45] Date of Patent: Jan. 15, 1985

[54] USE OF THYROTROPIN RELEASING HORMONE AND RELATED PEPTIDES AS POULTRY GROWTH PROMOTANTS

[75] Inventors: Frederick Leung; Roger M. Weppelman, both of Scotch Plains, N.J.

[73] Assignee: Merck & Co., Inc., Rahway, N.J.

[21] Appl. No.: 402,018

[22] Filed: Jul. 26, 1982

[51] Int. Cl.³ .............................................. A61K 37/02
[52] U.S. Cl. .................................................... 424/177
[58] Field of Search ............... 424/177; 260/112.5 TR

[56] References Cited

U.S. PATENT DOCUMENTS

| | | | |
|---|---|---|---|
| 2,619,420 | 9/1949 | Jukes | 424/177 |
| 3,746,697 | 7/1973 | Falkers et al. | 424/177 |
| 3,757,003 | 9/1973 | Falkers et al. | 424/177 |
| 3,865,934 | 2/1975 | Plotnikoff | 424/177 |
| 4,059,692 | 11/1977 | Takahashi et al. | 424/177 |
| 4,167,563 | 9/1979 | Mikura et al. | 424/177 |

OTHER PUBLICATIONS

Canada, *Ag. Res. Inst. of Ontario*, Apr. 1, 1977 to Mar. 31, 1978, Publ.: Toronto, Canada, Ministry of Agriculture and Food.
Harvey et al., (I) *Neuroendocrinology*, 26, 249–269, (1978).
Harvey et al., (II) *British Poultry Science*, 20, 9–17, (1979).
Scanes et al., *Poultry Science*, 59, 159–163, (1980).
Pethes et al., *Acta Veterinaria Academiae Scientiarum Hungaricase*, 27, 175–177, (1979).
*Poultry Science*, 34, pp. 1329–1331, (1955).
*Journal of Endocr.*, (1983), 97, 127–135.
*Poultry Science*, 39, pp. 1527–1533, (1960).

*Primary Examiner*—Delbert R. Phillips
*Assistant Examiner*—F. T. Moezie
*Attorney, Agent, or Firm*—David L. Rose; Mario A. Monaco

[57] ABSTRACT

Thyrotropin Releasing Hormone (TRH) and related synthetic peptides extend the rapid growth phase of poultry thereby decreasing the time required to produce fowl of marketable size.

3 Claims, No Drawings

USE OF THYROTROPIN RELEASING HORMONE AND RELATED PEPTIDES AS POULTRY GROWTH PROMOTANTS

BACKGROUND OF THE INVENTION

This invention is concerned with the use of thyrotropin releasing hormone (TRH) or a related tripeptide as a growth promotant for poultry.

The United States broiler chicken industry has been quite successful in providing high protein meat at relatively low cost to the consumer. Nonetheless it is always striving to improve the efficiency of its operations to make the industry more profitable and/or decrease the market cost of the product. There are several factors that can be explored toward this end such as improving feed efficiency, and one very important factor, the length of time required to produce a marketable bird from a chick. Clearly the shorter the time the better.

At present, broiler chickens in the United States grow at their maximum exponential rate until they are about 4 weeks of age and their growth rate progressively decreases thereafter. Since chickens are usually slaughtered at 6 to 8 weeks of age their rate of growth during the final weeks is less than maximum. Thus one way of promoting the growth of broiler chickens would be to manipulate their endocrine system so that the period of most rapid growth is prolonged. Such a growth promotant would increase the growth rate of chickens older than approximately four weeks and would thereby decrease the time required to produce a bird of marketable weight.

Other growth promotants have been used in efforts to reduce the time of maturation of poultry such as certain antibiotics including bacitracin and tylosin with the usual onus that attaches to the use of antibiotics for such purposes. However, the industry has never had access to an endocrine mediated growth promotant and especially one devoid of safety problems.

Other commercial fowl production, although not on the same scale as the broiler industry would also benefit from the same improvements in efficiency.

Now, with the present invention, there is provided a method of promoting the growth of poultry. This method comprises the administration of TRH or a related tripeptide to poultry starting at about the time when their initial rapid growth rate begins to decrease and continuing until the desired final weight is attained. In the case of broiler chickens administration would normally begin at about 4 weeks of age and would continue until 6–8 weeks of age.

DETAILED DESCRIPTION OF THE INVENTION

This invention is concerned with the use of TRH and related tripeptides as endocrine mediated growth promotants for poultry such as chickens, and even more especially broiler chickens.

The tripeptides useful in the novel method of treatment and novel formulations of this invention are of formula:

$$M_1-M_2-M_3$$

or a pharmaceutically acceptable salt thereof, wherein:

$M_1$ is L-pyroglutamyl (Glp), L-cycloserinyl (CSer), L-cyclothreoninyl, (CThr), N-formyl-L-proline (HCO-Pro), L-Glutamic acid-5-methyl ester (Glu-(OMe)), L-Proline (Pro), L-2-Ketopiperidine-6-carbonyl (Kpc), D-2-ketopiperidine-6-carbonyl (D-Kpc), or L-2-ketoimidazolidine-4-carbonyl (Kic)

$M_2$ is L-histidyl (His), D-histidyl (D-His), L-leucine (Leu), L-α-methylhistidine (MeHis), L-phenylalanine (Phe), L-β-(pyrazolyl-1)alanine (Pyr(1)ala), L-β-(thienyl-2)alanine (Thi), L-im-N-methylhistidine (His(N Me)). L-β-(pyrazolyl-3)alanine (Pyr(-3)ala), L-methionine (Met), or L-im-N (CH$_2$COOH)histidine (His(N CH$_2$COOH), and, $M_3$ is L-prolinamide (Pro-NH$_2$), N-(6-aminohexyl)-L-prolinamide (Pro-NH(CH$_2$)$_6$NH$_2$), 2-methyl-L-alaninamide (MeAla-NH$_2$), N-methyl-L-prolinamide (Pro-NHMe), N-ethyl-L-prolinamide (Pro-NHEt), L-prolylglycinamide (Pro-Gly-NH$_2$), L-azetedinecarboxylic acid amide (Azet), L-prolyl-L-alaninamide (Pro-Ala NH$_2$), N-hexyl-L-prolylamide (Pr-NH(CH$_2$)$_6$Me), N-cyclohexyl-L-prolinamide (Pro-NH-cyclohexyl), L-thiazolidine-4-carboxamide (Tca-NH$_2$), L-piperidine-2-carboxamide (Pc-NH$_2$, or Methyl L-piperidine-2-carboxylate (Pc-OMe), A preferred group of compounds includes the following:

(1) Glp—His—Pro—NH$_2$ (TRH)
(2) Glp—His(N Me)—Pro—NH$_2$
(3) Glp—MeHis—Pro—NH$_2$
(4) Glp—Pyr(1)ala—Pro—NH$_2$
(5) Glp—His—Pro—Gly—NH$_2$
(6) Glp—Thi—Pro—NH$_2$
(7) Kpc—His—Tca—NH$_2$
(8) Kpc—His—Pro—NH$_2$
(9) Glp—His—Pc—NH$_2$ Of particular importance in the novel method of treatment is TRH with the systematic name as given above and the following chemical structure:

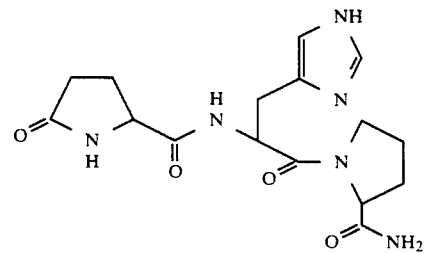

The novel method of treatment of this invention comprises the administration of an effective amount of one or more of the active tripeptides, previously defined, to poultry such as chickens, turkeys, geese or ducks, preferably chickens, starting at about the time when the initial exponential growth rate begins to decline and continuing until the desired body weight is attained. In the case of broiler chickens administration of active tripeptide would generally start at about 4 weeks of age and would continue until 6 to 8 weeks of age.

It is preferred that the active agent be administered daily, preferably but not necessarily in a single dose, during the treatment period. An effective amount of growth promotant is about 1 to 10 μg/day. The route of administration is by injection.

EXAMPLE 1

The Effect of Thyrotropin Releasing Hormone on Growth in 4-Week-Old Male Chicks Materials and Methods Four-week-old Hubbard x Hubbard cockerels were used in this experiment, and average initial weights were 841.75 g. Synthetic TRH (Beckman Co., Calif.) was dissolved in saline and given daily by intravenous injection via the brachial vein at 0.1 μg/bird, 1.0 μg/bird, and 10.0 μg/bird. Birds were weighed and feed consumption was measured at 2 times a week for 2½ weeks. Data were analyzed by least squares analyses of variance, using initial weight as a covariant.

Results

Fourteen and 17 days after the start of treatment, TRH given at 1.0 μg/bird/day and 10 μg/bird/day increased body weight significantly compared with birds receiving saline injections, . . . and birds that were receiving TRH injections at 0.1 μg/bird/day showed slight increase in the body weight (Table I). In terms of body weight gain, birds that are receiving 1.0 μg/bird/day and 10 μg/bird/day also showed a significant increase (P 0.01) as compared with control 14 and 17 days after the start of treatment. At the end of the experiment (17 days after treatment), TRH given at 1.0 μg/bird/day and 10 μg/bird/day showed a 12.0% and 12.4% increase in body weight gain as compared with the control birds (Table II).

EXAMPLE 2

The Effect of Thyrotropin Releasing Hormone On Growth In 4-Week-Old Male Chicks Materials & Methods Four-week-old Hubbard×Hubbard cockerels were used in this experiment, and average weight was 831.38 g. Synthetic TRH (Beckman Co., CA) was dissolved in saline and given daily by intravenous injection via the brachial vein at 0.1 μg/bird, 1.0 μg/bird, and 10 μg/bird. Birds were weighed twice a week for 4 weeks. Data were analyzed by least squares of variance, using initial weight as a covariant.

Results

TRH given at 1.0 μg/bird/day showed a significant increase in body weight as compared with birds that were receiving saline injections on 22 ($p\ 0.05$) and 25 ($p\ 0.025$) days after the start of treatment, and birds that were receiving TRH injections at 0.1 μg/bird/day and 10 μg/bird/day showed slight increase in body weight (Table III). In terms of body weight gain, similar data were also obtained. Birds that were receiving TRH injections at 1.0 μg/bird/day showed a significant increase as compared with control birds on 22 ($p\ 0.05$) and 25 ($p\ 0.025$) days after the start of treatment. At the end of the experiment, TRH given at 0.1 μg/bird/day and 1.0 μg/bird/day showed a 5.6% and 7.5% increase in body weight gain as compared with the control birds. Birds that were given 10 μg/bird/day showed slight increase in body weight gain throughout the whole experiment (Table IV).

TABLE I

EFFECTS OF THYROTROPIN RELEASING HORMONE (TRH) ON BODY WEIGHT IN 4-WEEK-OLD COCKERELS.

| Treatment | N | 0 | $3^a$ | $7^a$ | $10^a$ | $14^a$ | $17^a$ |
|---|---|---|---|---|---|---|---|
| Control | 9 | 845.0 | 1008.3 ± 9.1 | 1211.9 ± 13.8 | 1377.1 ± 18.5 | 1597.8 ± 23.2 | 1761.5 ± 26.0 |
| TRH (0.1 μg/bird) | 8 | 837.0 | 1009.3 ± 9.7 (+0.1) | 1230.6 ± 14.7 (+1.5) | 1406.9 ± 19.7 (+2.2) | 1662.1 ± 24.8 (+4.0) | 1837.1 ± 27.8 (+3.9) |
| TRH (1.0 μg/bird) | 8 | 840.0 | 1011.8 ± 9.7 (+0.3) | 1246.7 ± 14.6 (+2.9) | 1420.5 ± 19.6 (+3.2) | 1693.7 ± 24.6* (+6.0) | 1878.8 ± 27.6* (+6.3) |
| TRH (10 μg/bird) | 10 | 845.0 | 1019.2 ± 8.7 (+1.1) | 1236.9 ± 13.1 (+2.1) | 1421.6 ± 17.6 (+3.2) | 1690.8 ± 22.0* (+5.8) | 1882.5 ± 24.7* (+6.5) |

$^a$ Least squares mean ± Standard error of the mean corrected by initial weight.
( ) Percent increased as compared with control.
*$P < 0.01$

TABLE II

EFFECTS OF TRH ON BODY WEIGHT GAIN IN 4-WEEK-OLD COCKERELS.

| Treatment | N | 3 | 7 | 10 | 14 | 17 |
|---|---|---|---|---|---|---|
| Control | 9 | 170.7 ± 9.1 | 374.3 ± 13.8 | 539.5 ± 18.5 | 757.0 ± 23.4 | 929.9 ± 26.0 |
| TRH (0.1 μg/bird) | 8 | 171.7 ± 9.8 (+0.6) | 393.1 ± 14.7 (+5.0) | 569.4 ± 19.7 (+5.5) | 824.3 ± 24.9 (+8.9) | 999.5 ± 27.8 (+7.5) |
| TRH (1.0 μg/bird) | 8 | 174.2 ± 9.7 (+2.1) | 409.2 ± 14.6 (+9.3) | 582.9 ± 19.6 (+8.0) | 856.2 ± 24.8* (+13.1) | 1041.2 ± 27.6* (+12.0) |
| TRH (10 μg/bird) | 10 | 181.6 ± 8.7 (+6.4) | 399.3 ± 13.1 (+6.7) | 584.0 ± 7.6 (+8.2) | 853.3 ± 22.2* (+12.7) | 1044.9 ± 24.7* (+12.4) |

( ) Percent increased as compared with control.
*$P < 0.01$

TABLE III

EFFECTS OF THYROTROPIN RELEASING HORMONE (TRH) ON BODY WEIGHT IN 4-WEEK-OLD COCKERELS

| Treatment | No. Birds | 0 | 4 | 8 | 11 | 15 | 18 | 22 | 25 |
|---|---|---|---|---|---|---|---|---|---|
| Control | 8 | 822.5 | 990.6 ± 8.3 | 1219.5 ± 15.1 | 1387.1 ± 20.3 | 1620.7 ± 20.4 | 1796.9 ± 24.3 | 2010.3 ± 26.4 | 2194.0 ± 28.7 |
| TRH (low) 0.1 μg/bird | 8 | 831.7 | 1012.2 ± 8.3 (+2.2) | 1248 ± 15.0 (+2.4) | 1426.4 ± 20.3 (+2.8) | 1664.2 ± 20.4 (+2.7) | 1856.9 ± 24.2$^a$ (+3.3) | 2084.7 ± 26.3$^a$ (3.7) | 2269.3 ± 28.7$^a$ (3.4) |
| TRH (med.) | 9 | 835.6 | 1010.3 ± 7.8 | 1254.1 ± 14.2 | 1415.4 ± 19.1 | 1664.4 ± 19.2 | 1860.1 ± 22.8$^a$ | 2091.7 ± 24.8$^b$ | 2294.4 ± 27.0$^c$ |

TABLE III-continued

EFFECTS OF THYROTROPIN RELEASING HORMONE (TRH) ON BODY WEIGHT IN 4-WEEK-OLD COCKERELS

| Treatment | No. Birds | Days After Start of Treatment | | | | | | |
|---|---|---|---|---|---|---|---|---|
| | | 0 | 4 | 8 | 11 | 15 | 18 | 22 | 25 |
| TRH (high) 10 μg/bird | 8 | 831.7 | 997.7 ± 8.3 (0.7) | 1219.1 ± 15.0 (0) | 1381.7 ± 20.3 (0) | 1627.6 ± 20.4 (0.4) | 1821.6 ± 24.2 (1.4) | 2034.4 ± 26.3 (1.2) | 2232.1 ± 28.7 (1.7) |

(Row above labeled 1.0 μg/bird shows: (+2.0), (+2.8), (+2.0), (+2.7), (+3.5), (4.1), (4.6))

Least squares mean ± standard error of the mean corrected by initial weight.
(Δ) = Percent increased as compared with control.
$a = p < 0.1$
$b = p < 0.05$
$c = p < 0.025$

TABLE IV

EFFECTS OF TRH ON BODY WEIGHT GAIN IN 4-WEEK-OLD COCKERELS

| Treatment | No. Birds | Days After Start of Treatment | | | | | | |
|---|---|---|---|---|---|---|---|---|
| | | 4 | 8 | 11 | 15 | 18 | 22 | 25 |
| Control | 8 | 149.4 ± 8.4 | 378.2 ± 15.1 | 546.1 ± 20.5 | 779.5 ± 20.5 | 955.6 ± 24.4 | 1169.0 ± 26.4 | 1351.8 ± 28.7 |
| TRH (low) 0.1 μg/ | 8 | 167.1 ± 8.4 (11.8) | 407.6 ± 15.1 (7.8) | 585.1 ± 20.5 (7.0) | 822.9 ± 20.4 (5.6) | 1015.8 ± 24.3$^a$ (6.3) | 1243.5 ± 26.3$^a$ (6.4) | 1428.1 ± 28.7$^a$ (5.6) |
| TRH (med.) 1.0 μg/ | 9 | 170.1 ± 7.9 (13.9) | 413.4 ± 14.2 (9.3) | 573.1 ± 19.3 (4.5) | 823.2 ± 19.2 (5.7) | 1018.9 ± 22.9$^a$ (6.6) | 1250.5 ± 24.8$^b$ (7.0) | 1453.2 ± 27.0$^c$ (7.5) |
| TRH (high) 10 μg/bird | 8 | 156.3 ± 8.4 (4.6) | 377.9 ± 15.1 (0) | 542.9 ± 20.5 (0) | 786.4 ± 20.4 (0.9) | 981.5 ± 24.3 (2.7) | 1193.2 ± 26.3 (2.1) | 1390.9 ± 28.7 (2.9) |

(Δ) = Percent increase as compared with control.
$a = p < 0.1$
$b = p < 0.05$
$c = p < 0.025$

What is claimed is:

1. A method of promoting growth in poultry immediately following the exponential growth phase which comprises the daily administration to the poultry during the period from the fourth to the eighth week of life of from one to ten micrograms/bird/day of a compound of the formula:

$$M_1—M_2—M_3$$

or a pharmaceutically acceptable salt thereof, wherein
  $M_1$ is L-pyroglutamyl (Glp), L-cycloserinyl (CSer), L-cyclothreoninyl, (CThr), N-formyl-L-proline (HCO-Pro), L-Glutamic acid-5-methyl ester (Glu-(OMe)), L-Proline (Pro), L-2-ketopiperidine-6-carbonyl (Kpc), D-2-ketopiperidine 6-carbonyl (D-Kpc), or L-2-ketoimidazolidine-4-carbonyl (Kic);
  $M_2$ is L-histidyl (His), D-histidyl (D-His), L-leucine (Leu), L-@-methylhistidine (MeHis), L-phenylalanine (Phe), L-β-(pyrazolyl-1)alanine (Pyr(1)ala), L-β-(thienyl-2)alanine (Thi), L-im-N-methylhistidine (His(N Me)), L-β-(pyrazolyl-3)alanine (Pyr(-3)ala), L-methionine (Met), or L-im-N (CH$_2$COOH)histidine (His(N CH$_2$COOH); and
  $M_3$ is L-prolinamide (Pro-NH$_2$), N-(6-aminohexyl-L-prolinamide (Pro-NH(CH$_2$)$_6$NH$_2$), 2-methyl-L-alaninamide (MeAla-NH$_2$), N-methyl-L-prolinamide (Pro-NHMe), N-ethyl-L-prolinamide (Pro-NHEt), L-prolylglycinamide (Pro-Gly-NH$_2$), L-azetedinecarboxylic acid amide (Azet), L-prolyl-L-alaninamide (Pro-Ala-NH$_2$), N-hexyl-L-prolylamide (Pr-NH(CH$_2$)$_6$Me), N-cyclohexyl-L-prolinamide (Pro-NH-cyclo-hexyl), L-thiazolidine-4-carboxamide (Tca-NH$_2$), L-piperidine-2-carboxamide (Pc-NH$_2$), or Methyl L-piperidine-2-carboxylate (Pc-OMe).

2. The method of claim 1, wherein the compound is selected from:
  (1) Glp—His—Pro—NH$_2$, (TRH),
  (2) Glp—His(N Me)—Pro—NH$_2$,
  (3) Glp—MeHis—Pro—NH$_2$,
  (4) Glp—Pyr(1)ala-Pro-NH$_2$,
  (5) Glp—His—Pro—Gly—NH$_2$,
  (6) Glp—Thi—Pro—NH$_2$,
  (7) Kpc—His—Tca—NH$_2$,
  (8) Kpc—His—Pro—NH$_2$, and
  (9) Glp—His—Pc—NH$_2$.

3. The method of claim 2 wherein the compound is TRH.

* * * * *

UNITED STATES PATENT AND TRADEMARK OFFICE
CERTIFICATE OF CORRECTION

PATENT NO. : 4,493,828

DATED : January 15, 1985

INVENTOR(S) : Frederick Leung et al.

It is certified that error appears in the above—identified patent and that said Letters Patent is hereby corrected as shown below:

In Column 5 line 45 "@" should read -- ℓ --

Signed and Sealed this

Twenty-sixth Day of November 1985

[SEAL]

Attest:

DONALD J. QUIGG

Attesting Officer

Commissioner of Patents and Trademarks